Oct. 11, 1932.  A. C. SINGER  1,882,234

AUTOMATIC CONTROL SYSTEM

Filed Sept. 1, 1931  2 Sheets-Sheet 1

INVENTOR
Andrew C. Singer
by his attorneys
Byrnes, Stebbins, Parmelee & Blenko

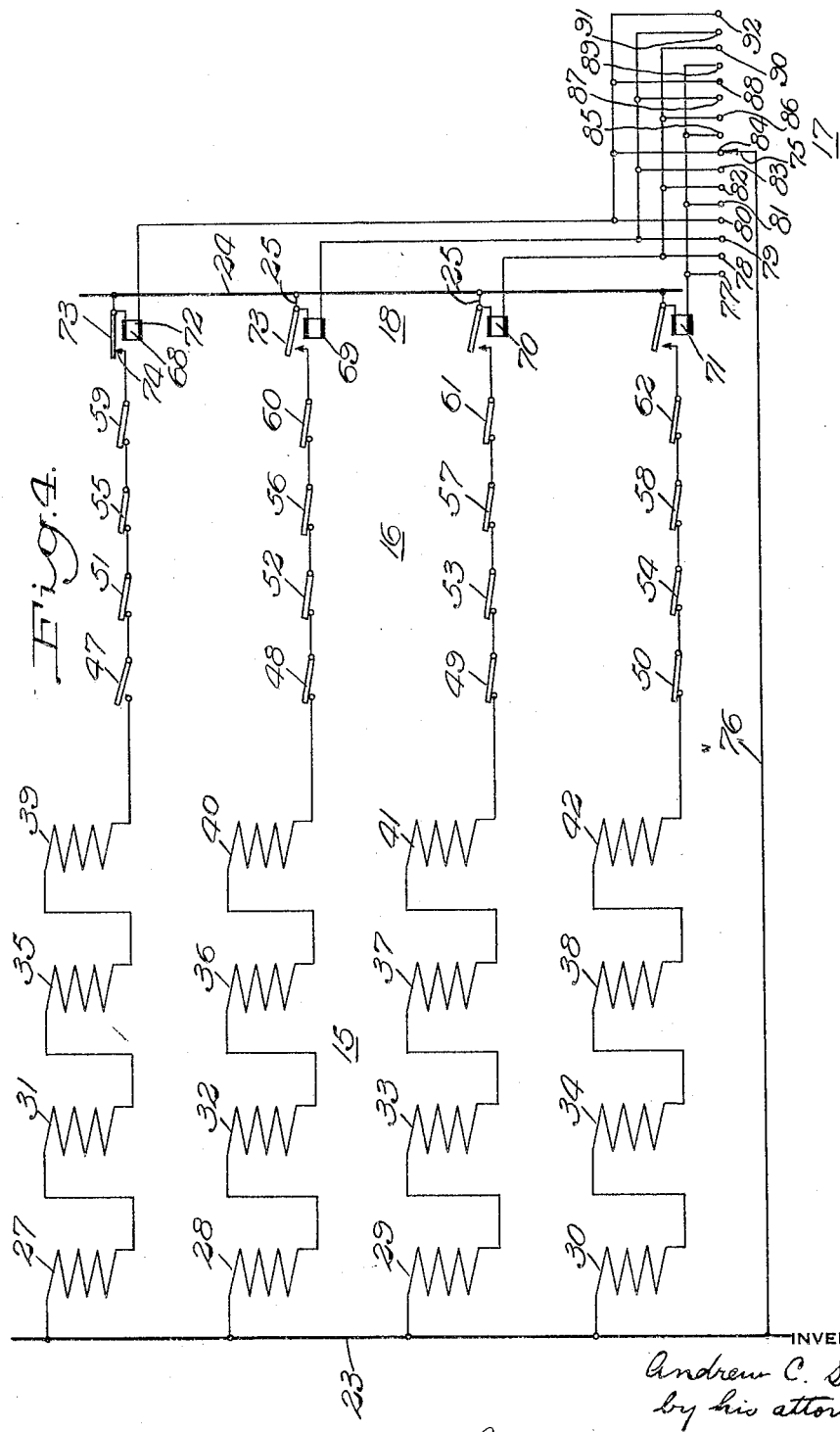

Patented Oct. 11, 1932

1,882,234

UNITED STATES PATENT OFFICE

ANDREW C. SINGER, OF McKEES ROCKS, PENNSYLVANIA

AUTOMATIC CONTROL SYSTEM

Application filed September 1, 1931. Serial No. 560,531.

My invention relates to a system for automatically controlling a movable member and, in particular, to a system of this character which provides continuous automatic regulation in small steps for any member or device to be regulated.

Although I am aware that numerous types of control systems have been proposed heretofore, I have encountered certain applications for control systems which cannot be satisfactorily provided for by devices heretofore known. An object of the invention, therefore, is to provide a system having certain desirable characteristics rendering it applicable to a wide variety of control installations. While the invention has been made with a view to a certain specific application, namely, the regulation of the expansion valve in a refrigerating system and will be described in such connection, the range of applicability of the invention is almost unlimited. It can be employed, in fact, in almost any case where it is desired to control automatically the movement of any element or member in accordance with preselected conditions.

Such control systems of the prior art of which I am familiar, are characterized by a lack of fineness in adjustment and positiveness in operation. It is another object of the invention, therefore, to provide a control system which shall be capable of making very fine adjustments and, at the same time, shall be positive in operation.

In accordance with my invention, I employ a step-by-step electromagnetic motor comprising a rotatable armature and a plurality of electromagnets adapted to be energized successively to attract the armature. While motors of this type are not broadly new, I have incorporated therein a control device which, as far as I am aware, is entirely novel and produces very desirable results. The control device above mentioned includes a plurality of switches adapted to control the magnet coils of the motor so that they will be energized only long enough to insure proper movement of the armature. Excessive consumption of current and overheating of the magnet coils is thus entirely avoided.

In the application of the invention which will be described in detail herein, I utilize a contact-making thermometer responsive to the temperature of the vapor in the return line in a refrigerating system for controlling the movement of the motor to adjust the setting of the expansion valve. This arrangement tends to maintain a constant temperature on a freezing bath cooled by the refrigerant traversing the expansion valve.

For a complete understanding of the invention reference should be made to the accompanying drawings representing a present preferred embodiment of the invention. In the drawings, Figure 1 is a schematic diagram of the invention as applied to the control of the expansion valve in a refrigerator system;

Figure 4 is a complete electric diagram, illustrating the circuit connections between the various elements of the system.

Figure 1:
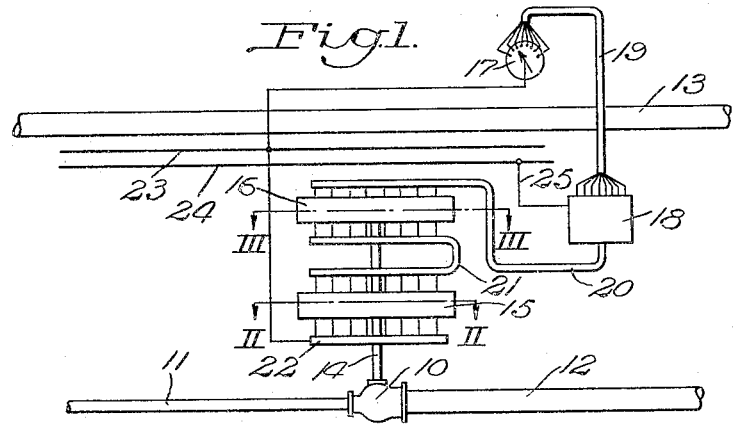

Referring now in detail to the drawings, an expansion valve 10 of any suitable type controls the admission of ammonia or other refrigerant from a high-pressure pipe line 11 leading to the discharge side of a compressor into a low-pressure line 12 leading to the cooling coil in a freezing bath or refrigerated chamber. A return line 13 conducts the expanded vapor from the cooling coil to the intake side of the compressor for return through the cooling cycle.

The valve 10 has a stem 14. A motor indicated generally at 15 is shown in detail in Figure 2 is mounted on any suitable support (not shown) and has its armature mounted on the stem 14 so that rotation of the motor armature will adjust the setting of the valve 10. A control switch indicated generally at 16 in Figure 1 and illustrated in detail in Figure 3, operates to deenergize the electromagnets of the motor 15 after the proper adjustment of the valve stem 14 has been made.

The operation of the motor 15 is under the direct control of a contact-making thermometer 17 responsive to the temperature of the refrigerant in the return line 13. The contact-making thermometer is connected to a relay panel 18, for example through a cable 19 having its conductors branched out at either end for connection to the various contacts and relays of the thermometer 17 and the panel 18. From the panel 18, a similar cable 20 makes connection to various contacts in the switch mechanism 16. A cable 21 connects the switch 16 and the motor 15, and cable 22 makes connection from the motor 15 to a supply bus 23. A bus 24, forming the other side of the supply circuit, has a connection 25 to the relay panel.

Referring now in particular detail to Figure 2, the motor 15 comprises an armature 26, here shown as of four poles, and a plurality of stationary field magnets 27 through 42 equal in number to a multiple of the number of poles on the armature 26. One of the electromagnetic field coils 27 is shown partially in section and comprises a core 43 formed by projections on a plurality of ring-shaped laminations 44. The coil of the magnet 27 is indicated in section at 46.

It will be apparent that in the position shown in Figure 2, the armature poles are in alinement with the electromagnets 27, 31, 35 and 39. It will also be apparent that if the electromagnets 28, 32, 36 and 40 are simultaneously energized, a torque will be exerted upon the armature 36 and the valve stem 14, tending to rotate them counter-clockwise. Similarly, if the magnets 30, 34, 38 and 42 are energized, a corresponding torque in the reverse or clockwise direction will be exerted upon the armature.

In order to control the energization of the electromagnets constituting the motor fields so as to adjust the expansion valve 10 to maintain a constant temperature in the freezing bath or refrigerating chamber, the contact-making thermometer 17 is designed to operate relays in the panel 18 to energize various groups of magnets in the motor field. The operation of the contact-making thermometer and the relays to effect this end will be explained fully in connection with a consideration of Figure 4, hereinafter. In addition to effecting the energization of the various magnets of the motor 15, it is also desirable to deenergize the magnets after they have effected the desired movement of the motor armature and corresponding adjustment of the expansion valve 10. The switch mechanism 16 serves to perform this function.

The switch mechanism 16 includes a plurality of switches 47 through 62, equal in number to the electromagnets of the motor 15. Each switch similar to that shown at 47 comprises a fixed contact 63 and a pivoted contact 64. These contacts may be insulatingly supported from a frame 65 carried by any desired means, or the frame 65 itself may be of insulating material. A spring-pressed plunger 66 is provided for opening each switch when engaged by a rotating arm 67 on the valve stem 14. The operation of the switch mechanism to open the circuit of any group of magnets on movement of the armature 26 in response to the energization of said group of magnets will be obvious from the above description of the mechanism 16. Inasmuch as no circuit connections have been shown in Figures 2 and 3, however, I shall now refer to Figure 4 for a complete description of such connections.

Figure 2:
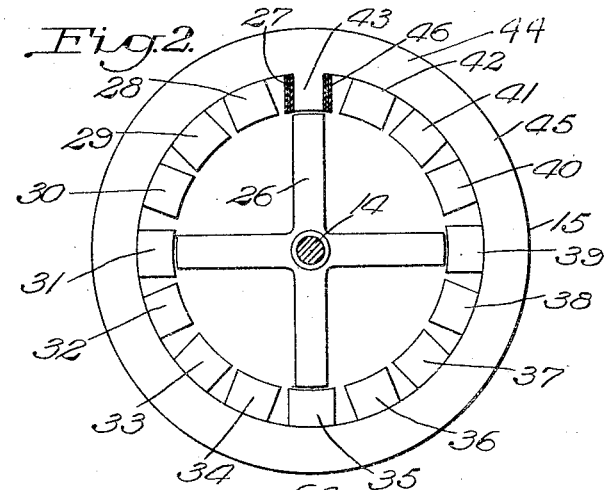
Figure 2 is a sectional view through the motor, taken substantially along the line II—II of Figure 1.
Figure 3:
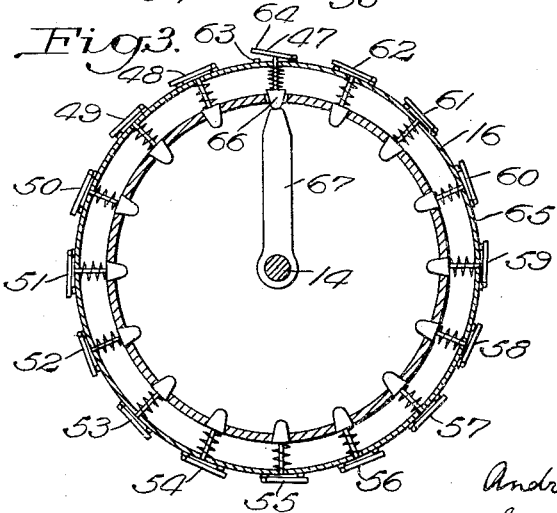
Figure 3 is a sectional view of the magnet-controlling switch taken substantially along the line III—III of Figure 1.

In Figure 4, the motor 15, switch mechanism 10 and contact-making thermometer 17 and the relay panel 18, are indicated generally by the same reference numerals as in Figures 1 through 3. The individual electromagnetic coils and switches of the switch motor are similarly designated, as are the supply buses 23 and 24. The relays forming the panel 18 are indicated at 68, 69, 70 and 71. Each relay comprises an electromagnet coil 72, a moving contact 73 controlled thereby, and a fixed contact 74. The contact-making thermometer comprises a moving contact 75 connected to the bus 23 by conductor 76 and a plurality of fixed contacts 77 through 92. As will be clear from an inspection of Figure 4, the electromagnets of the motor and the switches of the switch mechanism are connected in series circuits including a number of coils and switches equal to the number of poles on the armature. The four series circuits including the magnet coils of the switches are controlled by the relays 68 through 71. The relays in turn are controlled by the contact-making thermometer 17, the fixed contacts of which are connected in parallel in groups of four to each of the relays.

The thermometer 17 may be constructed so that its moving contact 75 advances from one fixed contact to another upon any desired change in temperature, such as a quarter of a degree, if regulation of such fineness is desired. Under the conditions illustrated in Figure 4, the moving contact 75 engages a fixed contact 84 and completes a circuit from the bus 23 through the contacts of the thermometer to the relay 68 and the bus 34. The contact 73 of the relay 68 is thereby closed but, since the armature 26 occupies the position shown in Figure 2 in which its poles are in alinement with the electromagnets 27, 31, 35 and 39, the arm 67 is in alinement with the switch 47, which is therefore open so that the last-mentioned magnet coils are deenergized. Since the relays 69, 70 and 71 are deenergized, all the remaining magnet coils are deenergized. As long as contacts remain unchanged, therefore, the system consumes no current except that required for the energization of the relay 68 and there is no possibility for overheating the electromagnetic coils. The relay coils are designed for low current consumption and continuous operation without excessive temperature rises.

On an increase in the temperature of the refrigerant in the return line 13, indicating the need for the expansion of additional refrigerant, the moving contact 75 of the thermometer 17 moves into engagement with the fixed contact 83. The relay 72 is thereby deenergized and the relay 69 is energized. The closing of the contact 73 of the relay 69 completes the circuit in series for the electromagnets 28, 32, 36 and 40, including the switches 48, 52, 56 and 60. On the completion of this circuit, the armature 26 of the motor is subject to a torque, tending to turn it into a position such that the poles are in alinement with the energized electromagnets.

On rotation of the armature, the switch 47 closes, but since the relay 68 has previously been deenergized, there is no reenergization of the magnets 27, 31, 35 and 39. When the armature has completed its movement, however, the arm 67 of the switch mechanism 16 engages plunger 66 of the switch 48 to open the latter and deenergize the magnet coils which caused the armature to move. Until a further change in the temperature in the gas in the return line occurs, conditions remain as indicated, with only the relay 69 energized. A further increase in the temperature in the return line will cause further movement of the contact 75 until it engages the fixed contact 82 with the result that the relay 70 is energized and the armature 26 is swung further in a counter-clockwise direction to open the expansion valve 10 further. A decrease in the temperature in the return line has the opposite effect and moves the contact 75 in the opposite direction, and the reverse of the cycle just described takes place, with the result that the valve 10 is adjusted toward its closed position.

The system described can be employed to control any device over practically any range of operating conditions as long as the change in the controlling function is such as to permit step-by-step operation of the motor. After the armature has been rotated through ninety degrees, the groups of four coils are reenergized successively to effect further rotation. This is effected by the parallel connection of the controlling relays to the fixed contacts of the thermometer. It is thus possible to obtain any desired amount of angular movement of the armature and valve stem within the operating range of the thermometer. Devices such as the latter are known and require no detailed description. Instead of being calibrated for quarter degree changes, any other desired arrangement may be resorted to.

While the initial movement from each ninety-degree position of the armature is effected by the energization of the same electromagnets, a different switch in series therewith is opened at the completion of such movement. Thus, when the armature approaches the end of its first ninety-degree counter-clockwise movement from the position shown in Figure 2, the arm 67 opens the switch 51, which has the same effect, of course, as the opening of the switch 47.

It will be apparent from the foregoing description that the system disclosed herein is characterized by numerous advantages. In the first place, the system can be made responsive to very slight changes in any desired function, whether pressure, temperature, position or the like. In the second place, the movement of the controlled member is definite and positive and depends only on the controlling function. The system is continuously responsive to any changes in this function and follows such changes rapidly without any lagging. The energization of the magnets, furthermore, is discontinued as soon as the required adjustment of the movable member has been made so that current consumption and overheating are avoided. Since the exciting current for the motor magnets is controlled by relays having contacts designed to carry the required motor current, and since these relays may be energized by a minute current, any difficulties resulting from an attempt to control the motor current through the thermometer contacts is eliminated. Since the electromagnets are designed for only intermittent energization, they may be characterized by a high torque to afford a positive pull of the required magnitude on the armature. If the armature tends to overrun, furthermore, the circuit of the magnets causing its movement will be reclosed when it goes past the position of exact alinement so as to restore the armature to the exact position indicated by the control mechanism. Obviously, the system may be applied in numerous ways. The motor may control a fuel valve in response to oven or furnace temperature or a rheostat in a generator field circuit in accordance with the output voltage thereof.

Many other applications of the invention will occur to those skilled in the art, and no doubt many changes in the embodiment disclosed herein may be found possible. It is within the scope of my invention to make any such changes as fall within the terms of the appended claims.

I claim:

1. A motor having an armature, a plurality of magnets equal to some multiple of the number of poles on the armature, a switch for each magnet, said magnets and switches being connected in series in groups each having magnets and switches equal to the number of armature poles, the magnets of each group being positioned to cooperate simultaneously wtih said armature, said switches of each group being positioned correspondingly in the same order as the magnets, and means actuated by said armature for operating said switches.

2. The combination with a step-by-step motor having a multiple pole armature, of a plurality of magnets arranged for cooperation with said armature and connected in series in groups of magnets equal in number to the poles of the armature, a series of switches, one for each of said magnets, said switches being connected in groups in series with the groups of magnets, and means operated by movement of said armature for opening one of said switches to deenergize the group of magnets effecting such movement of the armature.

In testimony whereof I have hereunto set my hand.

ANDREW C. SINGER.